Dec. 27, 1966 J. P. SCHWEIGERT 3,294,267
SADDLE CARRIERS
Filed July 28, 1965

INVENTOR
JOHNNY P. SCHWEIGERT

BY DWIGHT N. MASON

ATTORNEY

# United States Patent Office 3,294,267
Patented Dec. 27, 1966

3,294,267
SADDLE CARRIERS
Johnny P. Schweigert, 106 S. 9th St.,
Livingston, Mont. 59047
Filed July 28, 1965, Ser. No. 475,355
4 Claims. (Cl. 214—450)

This invention relates to saddle carriers for horse trailers.

An important object of the invention is to provide a saddle carrier or support of improved construction and operation and to mount the same within the low ceiling storage compartment commonly provided in the front of horse vans or trailers.

Another and more specific object of the invention is to provide a saddle carrier which may accumulate two saddles and which has a sufficient range of movement to enable both saddles to be fully withdrawn from the storage compartment for easy accessibility and removal from their support.

Another important object is to provide a low friction saddle carrier which has no sliding parts and which utilizes low friction rollers in connection with all moving parts.

A further object is to provide a saddle carrier having novel means to support the saddles in such a manner that they will retain their shapes while allowing saddle blankets to dry out quickly and to shed dust and other foreign matter during transit.

Other important objects and advantageous of the invention will be apparent during the course of the following detailed description.

In the accompanying drawings forming a part of this application and in which like numerals are employed to designate like parts throughout the same, FIGURE 1 is a side elevational view of a saddle carrier according to a preferred embodiment shown in the extended position in association with a horse trailer shown partly in cross section;

Figure 1:
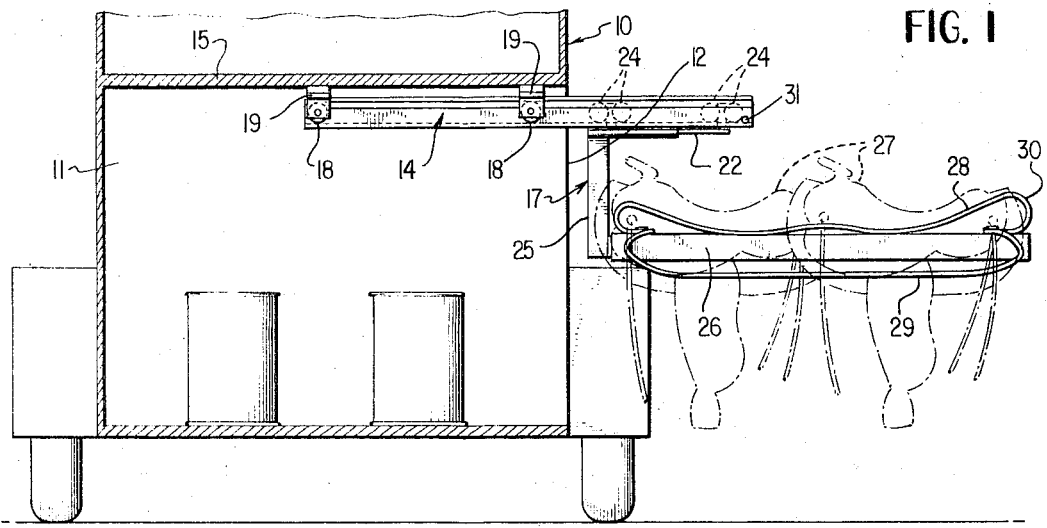
Figure 2:
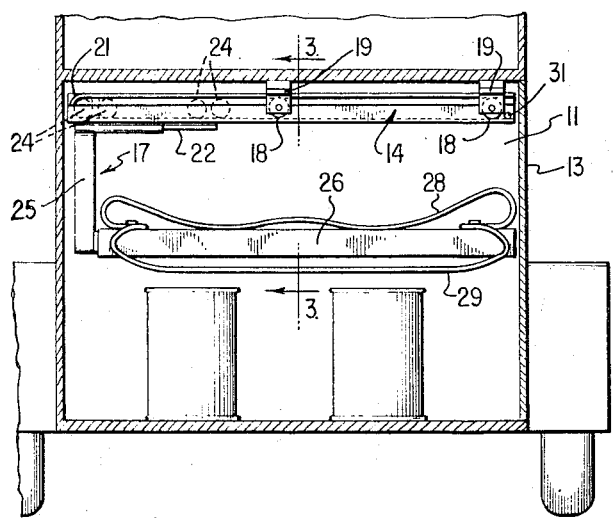
FIGURE 2 is a similar view of the saddle carrier and trailer with the carrier in the stowed position fully inside of the trailer.
Figure 3:
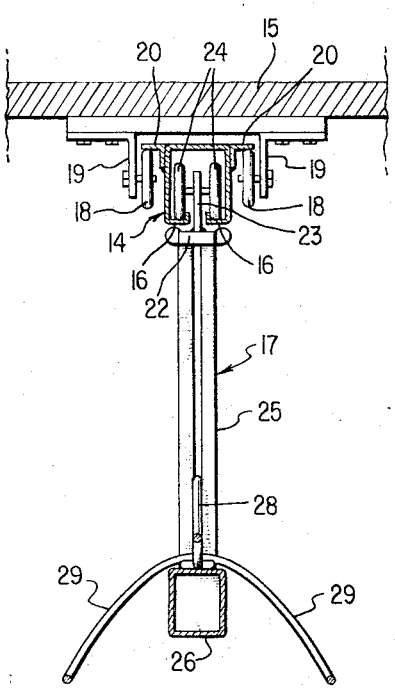
FIGURE 3 is an enlarged fragmentary transverse vertical section taken on line 3—3 of FIGURE 2.

In the drawings, wherein for the purpose of illustration are shown preferred embodiments of the invention, attention being directed first to FIGURES 1 to 3, the numeral 10 designates a conventional horse trailer or van having the usual forward low ceiling storage compartment 11 including a side access opening 12 having a door 13.

The compartment 11 is utilized to store cans of oats and other feed, a spare tire and miscellaneous gear, and its utility in this connection is not impaired by the provision of the invention saddle carrier.

The saddle carrier proper comprises a horizontal carriage rail 14 which extends transversely of the compartment 11 near and below the ceiling 15 thereof. This carriage rail 14 is substantially a box member in cross section, FIGURE 3, having a longitudinal slot formed through its bottom, providing a pair of parallel tracks 16 for the direct support of a saddle supporting frame 17, to be described in detail.

The carriage rail 14 is suspended on ball bearing type low friction rollers 18 preferably formed of nylon or the like, in turn journaled upon L-brackets 19, suitably rigidly secured to the ceiling 15 of the compartment. The brackets and rollers are arranged in pairs close to the top of the compartment 11 with one pair of rollers 18 near the transverse center of the compartment and one pair close to the open side thereof. The carriage rail 14 is equipped at its top and opposite sides with flanges 20 which rest directly upon the low friction rollers 18, as shown in FIGURE 3. The carriage rail 14 is thus suspended from and centered between the two pairs of rollers 18 at all times.

At their inner ends, the flanges 20 have curved stop extremities 21 to positively limit outward movement of the rail 14 to the position indicated in FIGURE 1. In the retracted position, FIGURE 2, the rail 14 spans the the compartment 11 for substantially its full width.

The previously mentioned saddle supporting frame 17 is mounted upon the carriage rail 14 for movement relative thereto and also relative to the stationary brackets 19 and rollers 18. The frame 17 comprises an overhead horizontal support arm 22 which lies close to the bottom of the carriage rail 14 and is suspended therefrom by a pair of spaced hangers 23 each carrying sets of low friction ball bearing type rollers 24 engaging the aforementioned tracks 16 and adapted to roll freely thereon. The sets of rollers 24 are arranged adjacent the ends of the support arm 22 and are in groups of four for stability. They are adapted to roll smoothly on the horizontal tracks 16 of the carriage rail 14.

The supporting frame 17 further comprises a depending vertical arm 25 at the rear end of arm 22 and rigid therewith, and a horizontal elongated saddle support arm 26 at the bottom of the arm 25 and rigidly secured thereto. As shown in FIGURE 3, the saddle support arm 26 is box-like in cross section, and this arm, while in the retracted position, FIGURE 2, spans approximately the full width of the compartment 11 and is adapted to support two saddles 27 in tandem relation, as depicted in broken lines in FIGURE 1.

In order to stabilize the supported saddles and to aid them in retaining their shapes, vertical and downwardly sloping contour rods 28 and 29 are suitably rigidly secured to the arm 26. The vertical contour rod 28 has upwardly sloping end portions to conform to the natural curvature of the two saddles longitudinally. The outer loop end 30 of the contour rod 28 also serves as a handle when the saddle carrier is moved manually from its retracted to its extended positions, and vice-versa. The sloping contour rods 29 support the sides of the saddle and the saddle blanket, allowing air to circulate beneath the blanket so that the same will dry quickly in transit. Natural vibration of the trailer causes the blanket to shed dust and debris and the contour rods facilitate this action. The contour rods are preferably somewhat resilient.

It is to be noted in connection with FIGURE 1 that both saddles 27 are fully outside of the compartment 11 when the carrier is fully extended. A stop pin 31 on carriage rail 14 positively limits the outward travel of the support frame 17 on its rollers 24. When the carrier is retracted, FIGURE 2, both saddles are fully enclosed and the door 13 may be shut. There still remains a useable storage space beneath the support arm 26, as shown in the drawings. The carrier is extremely smooth in operation and substantially free of friction.

Figure 4:
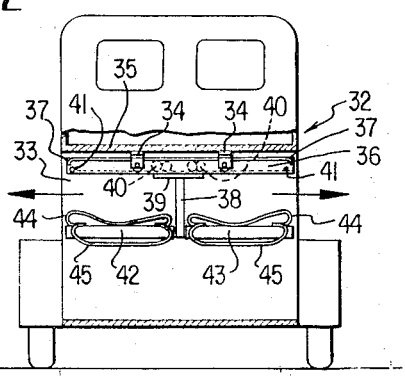
FIGURE 4 is a side elevation on a reduced scale of a saddle carrier and van according to a modification of the invention, partly in section.

FIGURE 4 shows a slight modification of the invention wherein one saddle may be withdrawn from each side of the van or trailer. In FIGURE 2, a trailer 32 is shown having a low ceiling compartment 33 opening through the opposite side walls of the trailer, suitable doors, not shown, being provided on both sides. A pair of brackets 34 carrying rollers substantially similar to the brackets 19 and rollers 18 are secured to the top wall 35 of compartment 33. A horizontal carriage rail 36 substantially similar to the rail 14 is shiftable in opposite directions upon the suspension rollers of the brackets 34 and is limited in its movements by curved stop flanges 37, as previously described.

A modified type of saddle support frame includes a central vertical post 38 secured at its top to a horizontal arm 39 having spaced sets of rollers 40 which engage the rail 36 and coact therewith in substantially the same manner described in connection with the rollers 24. The rail 36 has end stop pins 41 to limit the travel of the rollers 40 in opposite directions.

At its lower end, near the vertical center of the compartment 33, the post 38 carries horizontal saddle support arms 42 and 43 extending on opposite sides thereof, each adapted to support a single saddle and each equipped with contour rods 44 and 45 for the purposes already specified.

Both the rail 36 and the saddle support frame, as in the prior form of the invention, move relative to each other and to the brackets 34, substantially without friction and between fixed limits to extend one saddle fully outside of the compartment 33 on either side of the trailer, selectively, as indicated by the arrows in FIGURE 4. The construction has all of the other features and advantages enumerated above in connection with the prior embodiment. It is now believed that the advantages of the invention in both embodiments will be readily apparent to those skilled in the art without the necessity for any further description.

It is to be understood that the forms of the invention herewith shown and described are to be taken as preferred examples of the same and that various changes in the shape, size and arrangement of parts may be resorted to, without departing from the spirit of the invention or scope of the subjoined claims.

Having thus described my invention, I claim:

1. A saddle carrier for horse trailers having a low ceiling side opening storage compartment, said carrier comprising suspension bracket means secured to and depending from said low ceiling and including low friction rollers, a horizontal transversely shiftable carriage rail movably engaging said rollers and shiftable to an extended position partly outside of said compartment and to a retracted position fully within the compartment, positive stops means to limit movement of the carriage rail, and a saddle supporting frame mounted upon and depending from the carriage rail and having a horizontal saddle supporting arm beneath and spaced from said rail near the vertical center of said compartment, whereby the lower portion of said compartment is unobstructed and available for the storage of articles, said supporting frame equipped at its top with spaced low friction roller units having rolling engagement with the carriage rail, whereby the frame and rail are relatively movable.

2. The invention as defined by claim 1, and contour rods mounted upon the saddle supporting arm and conforming to the shape of a saddle and adapted to support a saddle blanket in spaced relation from said arm for quick drying.

3. The invention as defined by claim 1, and wherein said supporting frame comprises an upper horizontal arm immediately adjacent the carriage rail, a depending vertical arm on said upper arm at one end thereof and a lower saddle supporting arm of a length to support two saddles in tandem relation, said saddle supporting arm and said rail being of approximately equal length and extending substantially for the width of said compartment when said carrier is retracted.

4. The invention as defined by claim 1, and wherein said saddle supporting frame comprises an upper arm immediately adjacent the carriage rail, a depending vertical post on the upper arm centrally thereof, and a pair of single saddle horizontal support arms secured to the lower end of the post and extending on opposite sides thereof, whereby movement of the carriage and rail in opposite directions will position one saddle exteriorly of the horse trailer at one side thereof.

References Cited by the Examiner

UNITED STATES PATENTS

| | | | |
|---|---|---|---|
| 844,447 | 2/1907 | Gautier | 211—94 |
| 962,227 | 6/1910 | Kuersten | 211—94 |
| 2,091,071 | 8/1937 | Girl | 214—454 |

HUGO O. SCHULZ, *Primary Examiner.*